June 9, 1959   R. O. BOWMAN   2,889,657
FISH LURE
Filed Dec. 17, 1956
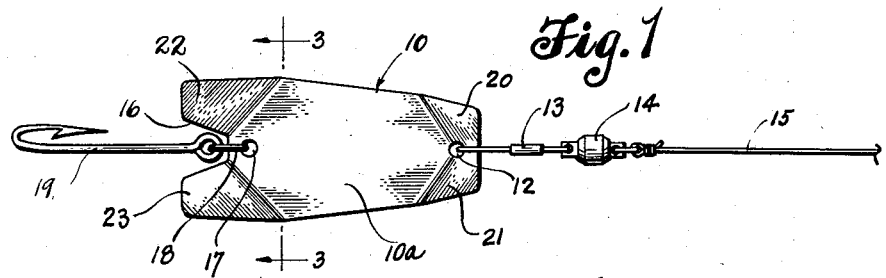
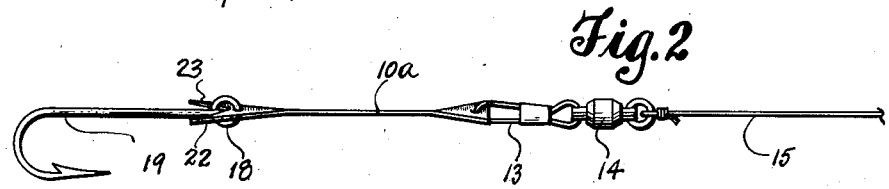
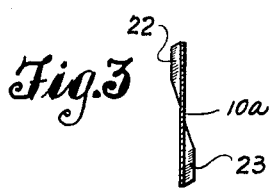
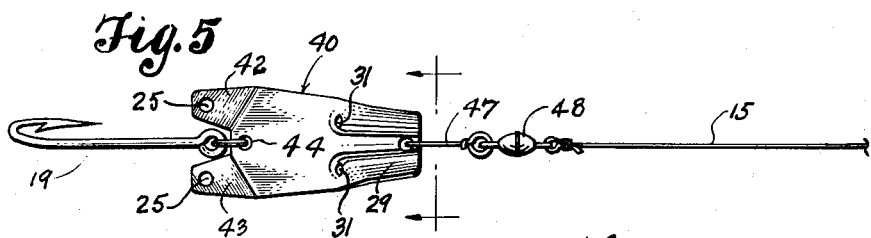
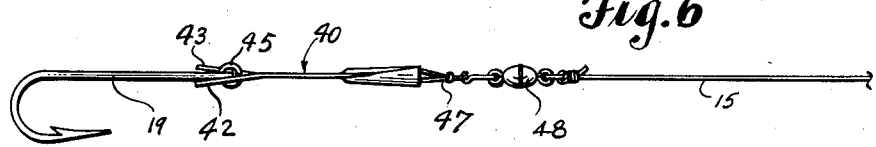
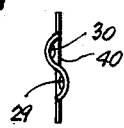
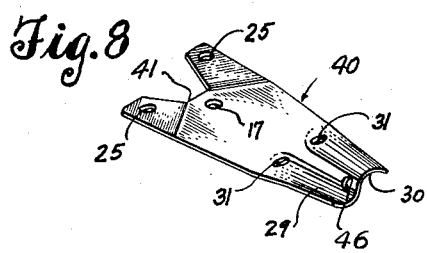
INVENTOR.
ROY O. BOWMAN
BY *Robinson & Berry*
ATTORNEYS

United States Patent Office 2,889,657
Patented June 9, 1959

2,889,657

FISH LURE

Roy O. Bowman, Everett, Wash.

Application December 17, 1956, Serial No. 628,793

2 Claims. (Cl. 43—42.06)

This invention relates to fish lures of those types or kinds employed in trolling, and it has reference more particularly to a lure which may be designated as one of a modified spoon or spinner type; it being the principal object of the invention to provide a lure that is stamped from or otherwise formed from a sheet material such as brass, and which embodies certain novel features in formation that cause it to have better fish luring and attracting action when drawn through the water at the end of a fishing line.

It is also an object of the present invention to provide a fish lure that may be stamped to its desired form from a sheet metal plate to provide the body of the lure with fins or deflectors which operate to give the lure an unpredictable darting or erratic action as drawn through the water and which also provide the lure with a maximum amount of flash or sheen for attracting the fish from greater distances.

Still further objects of the present invention reside in the details of formation of the various parts of the lure whereby the fish attracting action and other results are attained.

In accomplishing the above mentioned and other objects of the invention, I have provided the improved details of construction, the preferred forms of which are illustrated in the accompanying drawings, wherein:

Fig. 1 is a side or face view of a fish lure embodying the improvements of the present invention therein.

Fig. 2 is top edge view of the lure as seen in Fig. 1.

Fig. 3 is a cross-section of the lure, taken on the line 3—3 in Fig. 1, and looking toward its trailing end.

Fig. 4 is a forward end view of the lure in the position in which it is shown in Fig. 1.

Fig. 5 is a side or face view of a lure which is a modification of the lure shown in Fig. 1.

Fig. 6 is a top edge view of the lure as seen in Fig. 5.

Fig. 7 is a forward end view of the lure of Fig. 5.

Fig. 8 is a perspective view of the lure of Fig. 5 before hook and line are attached thereto.

Referring more in detail to the drawings, and first to the lure shown in Figs. 1 to 4 inclusive:

That part of the device which is stamped, cut or otherwise formed from sheet metal, and which is referred to as the lure, is designated in its entirety by reference numeral 10. Preferably the lure is die formed from sheet brass or other suitable sheet material and comprises a body portion that is substantially rectangular. As presently being made, the plate is approximately 2¼" long; 1¼" wide at its trailing end and ⅝" wide at its forward end. It is to be understood, however, that this plate or lure body may be made in larger or smaller sizes than here given, but should be approximately of the same proportionate dimensions as those given.

At its forward end, the body 10 is formed in the longitudinal axial line with a hole 12 for receiving the end of a link 13 for the attachment of a swivel 14, and a line or leader 15 is shown to be attached to the forward end loop of the swivel. At its rearward end, the body is likewise formed in its axial line with a rather deep cut V-shaped notch 16 of truncated form, and just forwardly of the vertex of this notch is a hole 17 to which a split ring 18 is applied for attachment of a fish hook 19.

The unpredictable or erratic action imparted to the lure when drawn through the water by the line 15, is due to certain forms given to designated parts of the body 10. It is to be observed, particularly by reference to Figs. 1, 2 and 3, that the body 10 has a perfectly flat portion 10a, between its ends, extending to its full width and nearly to its full length. At its forward end, and in reference to the position in which it is shown in Fig. 1, the upper corner portion is bent laterally at a slight angle, along a line leading upwardly and rearwardly from the hole 12 at approximately a 45° relative to the axial line of the body. Similarly, the lower corner portion is bent laterally but in the opposite direction, thus, at its forward end the body is equipped with the two substantially triangularly shaped fins 20 and 21, which would tend to impart rotation to the body about its axial line when drawn through the water.

At its rearward end, the body also has its upper and lower corner portions bent laterally in opposite directions relative to the plane of the body 10, thus to provide fins or deflectors 22 and 23. It is seen in Fig. 1 that the bending of each of these rear end fins is, in each instance, along a line that extends from the vertex end of the notch, outwardly and forwardly at an angle of about 45° relative to the axial line of the body. It is also shown that the forward and rearward end fins, as thus provided at the same longitudinal edge, are bent toward the same side of the body. The relationship of the laterally bent fins, as located at rearward and forward ends of the body are as shown in Figs. 3 and 4. The tendency of the plate or body to spin or rotate about its longitudinal axis under influence of the fins at its forward end is counteracted to great extent by the fins at the rearward end. The effect of the two sets of fins is to produce an unpredictable lure action that is featured by its darting in various directions, long spirals and erratic movements otherwise.

Assuming that the present lure is stamped from a sheet of polished metal, such as brass, it will then be understood that the flat surfaces of the body and the fins will reflect light in a multiplicity of directions, and in a manner that will attract fish from long distances, and the luring effect of flashes of reflected light is supplemented by the erratic action of the lure in the water.

The modification of the present lure that is illustrated in Figs. 5 to 8 embodies all the features of the lure of Fig. 1. In this device the body 40 is formed with the rear end notch or recess 41 and the fins 42 and 43 at opposite sides of the notch or recess are likewise bent angularly in opposite directions, and these fins are formed in their end portions with holes 25—25 to add to turbulence of water created by the lure as drawn therethrough or to provide for attachment of additional hooks. This body, also, is formed just ahead of the notch 41 with a hole 44 for receiving a hook attaching ring 45, and at its forward end it is formed with a hole 46 for reception of a swivel attaching link 47 for the swivel 48.

The forward end portion of the lure of Fig. 5, instead of being formed with the triangular fins of the device of Fig. 1, is bent transversely with a reverse curve, that is, to provide a surface of S form in end view, as observed in Fig. 7. Thus the plate is formed with channels 29 and 30 faced in opposite directions and extending lengthwise of the body, at opposite sides of its axial line, to about one-third of its length. At their rearward ends, the channels bases merge into the metal of the flat body and is there formed with holes 31—31 opening through the body.

The action of this lure in the water is substantially like that of the line of Fig. 1, but probably creates a little more turbulence by reason of the holes 25—25 through the rear end fins and holes 31 in the forward end of the body.

It is also observed that in each instance, the longitudinal edges of the plate are slightly converged in the forward direction, and this might be to slightly greater or lesser extent. The angulation of the fins relative to the plane of the body 10 should be approximately as shown but could be slightly more or less.

Lures of this kind can be made in various sizes at relatively small cost. When drawn through the water, their action is erratic and non-predictable.

What I claim as new is:

1. A fish lure comprising a flat, substantially rectangular plate, formed centrally at its rear end with a V-shaped recess directed forwardly thereinto, and having the corner portions thereof at opposite sides of the recess bent angularly toward opposite sides of the plate, and having the forward end portion of the plate bent to S form in its transverse direction, thus providing longitudinally directed channels along opposite sides of its axial line, faced opposite to the angular direction of bending of the corresponding rearward corner portion of the plate; said channels merging at their rear ends in rounded surfaces merging into the flat body portion of the plate and formed with holes through said rounded end portions.

2. A lure according to claim 1 wherein the angularly bent corner portions at the rear end of the line have holes formed therethrough near their end edges.

References Cited in the file of this patent

UNITED STATES PATENTS

| | | |
|---|---|---|
| 1,837,656 | Crosby | Dec. 22, 1931 |
| 1,871,377 | Khoenle | Aug. 9, 1932 |
| 2,264,211 | La Chance | Nov. 25, 1941 |
| 2,500,707 | Rosinski | Mar. 14, 1950 |
| 2,559,042 | Norris | July 3, 1951 |
| 2,758,408 | Murphy et al. | Aug. 14, 1956 |